(12) United States Patent
Morimoto et al.

(10) Patent No.: US 12,158,674 B2
(45) Date of Patent: Dec. 3, 2024

(54) LIQUID CRYSTAL DISPLAY DEVICE

(71) Applicant: Japan Display Inc., Tokyo (JP)

(72) Inventors: Masateru Morimoto, Tokyo (JP); Teppei Yamada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/419,768

(22) Filed: Jan. 23, 2024

(65) Prior Publication Data

US 2024/0248354 A1    Jul. 25, 2024

(30) Foreign Application Priority Data

Jan. 25, 2023    (JP) ................................ 2023-009138

(51) Int. Cl.
     *G02F 1/1362*      (2006.01)

(52) U.S. Cl.
     CPC .. *G02F 1/136209* (2013.01); *G02F 1/136222* (2021.01); *G02F 1/136227* (2013.01); *G02F 1/136286* (2013.01)

(58) Field of Classification Search
None
See application file for complete search history.

(56) References Cited

U.S. PATENT DOCUMENTS

| | | | |
|---|---|---|---|
| 2009/0015762 A1 | 1/2009 | Noguchi | |
| 2017/0160585 A1* | 6/2017 | Liang | G02F 1/133617 |
| 2019/0196281 A1* | 6/2019 | Oikawa | H01L 27/124 |
| 2019/0258124 A1* | 8/2019 | Morinaga | G02F 1/133707 |

FOREIGN PATENT DOCUMENTS

JP      2009-15204 A      1/2009

* cited by examiner

*Primary Examiner* — Richard H Kim
(74) *Attorney, Agent, or Firm* — Maier & Maier, PLLC

(57) ABSTRACT

In a liquid crystal display device in which a first light shielding film extending in a first direction and an image signal line are formed on a TFT substrate, the image signal line includes: in a region that does not overlap the first light shielding film, a first portion extending at a first angle with respect to a second direction perpendicular to the first direction; and, in a region that overlaps the first light shielding film, a second portion extending at a second angle with respect to the second direction, a third portion extending in the second direction, and a fourth portion extending at a fourth angle with respect to the second direction, and the second angle and the fourth angle are larger than the first angle.

12 Claims, 8 Drawing Sheets

LIQUID CRYSTAL DISPLAY DEVICE

CLAIM OF PRIORITY

The present application claims priority from Japanese patent application JP 2023-9138 filed on Jan. 25, 2023, the content of which is hereby incorporated by reference into this application.

BACKGROUND

The present invention relates to a high-definition liquid crystal display device.

In a liquid crystal display device, a TFT substrate in which pixels having a pixel electrode, a thin film transistor (TFT) and so on are formed in a matrix pattern, and an opposite substrate is disposed facing the TFT substrate, and a liquid crystal is held between the TFT substrate and the opposite substrate. An image is formed by controlling the transmittance of light from the backlight by liquid crystal molecules for each pixel.

The liquid crystal display device is also used for a display device that requires a high-definition screen, such as a VR (Virtual Reality) display device (hereinafter sometimes referred to as VR). In a high-definition screen, the pixel pitch is small, so a problem about the transmittance of a pixel arises.

On the other hand, as for the liquid crystal, since only deflection light can be controlled, in the light from the backlight, only the light based on a specific deflection method is picked up by a lower deflection plate and modulated by a liquid crystal layer, and light with a specific deflection direction is emitted as an image from an upper deflection plate. When deflection eyeglasses or the like are used, in some cases the image from the liquid crystal display device becomes less visible due to the deflection direction of the light. Japanese Unexamined Patent Application Publication No. 2009-15204 describes an approach to address this problem by changing the shape of the pixel electrode.

SUMMARY

In a high-definition screen that is used for VR or the like, the pixel pitch is very small. For example, the size of a single pixel is as small as 7 μm×21 μm. A liquid crystal screen is comprised of red pixels, green pixels, and blue pixels and each pixel is sometimes called a sub-pixel, but in this specification, it is called a pixel. For such a small pixel, there is a limit to adjustment of the shape of the pixel electrode.

On the other hand, it is difficult to decrease the size of a through hole made in an organic passivation film for connection between the pixel electrode and TFT even when the pixel pitch is small. This is because the organic passivation film must have a specific thickness. This poses a problem about how a large through hole should be disposed in a small pixel.

The object of the present invention is to solve the above problem and provides a high-definition liquid crystal display device that can assure a required image quality.

The present invention is to solve the above problem and specific solution is as follows.

(1) In a liquid crystal display device in which a first light shielding film extending in a first direction and an image signal line are formed on a TFT substrate, the image signal line includes: in a region that does not overlap the first light shielding film, a first portion extending at a first angle with respect to a second direction perpendicular to the first direction; and, in a region that overlaps the first light shielding film, a second portion extending at a second angle with respect to the second direction, a third portion extending in the second direction, and a fourth portion extending at a fourth angle with respect to the second direction, and the second angle and the fourth angle are larger than the first angle.

(2) In the liquid crystal display device according to (1), the second angle and the fourth angle are the same.

(3) In the liquid crystal display device according to (1), a first image signal line has a structure of the image signal line in (1), a second image signal line has the structure of the image signal line in (1), a first region is located between the first portion of the first image signal line and the first portion of the second image signal line, a third region is located between the third portion of the first image signal line and the third portion of the second image signal line, and a distance between the first image signal line and the second image signal line is larger in the third region than in the first region.

(4) In the liquid crystal display device according to (3), in the first region, a pixel electrode exists, a TFT to connect the first image signal line and the pixel electrode exists, and in the third region, a through hole to connect the pixel electrode and the TFT is formed.

(5) In the liquid crystal display device according to (4), the pixel electrode is formed over an organic passivation film, the TFT is formed under the organic passivation film, and the through hole is formed in the organic passivation film.

DESCRIPTION OF THE PREFERRED EMBODIMENTS

Hereinafter, the present invention will be explained in detail according to the preferred embodiments. Liquid crystal display devices are available in pixel electrode top type and common electrode top type, depending on the positional relation between a pixel electrode and a common electrode. Furthermore, in the past, a color filter has been often formed on the opposite substrate, but in high-definition liquid crystal display devices, a color filter may be formed on the TFT substrate. This is called COA (Color Filter on Array). The present invention can be applied to any of these types.

First Embodiment

Figure 1:
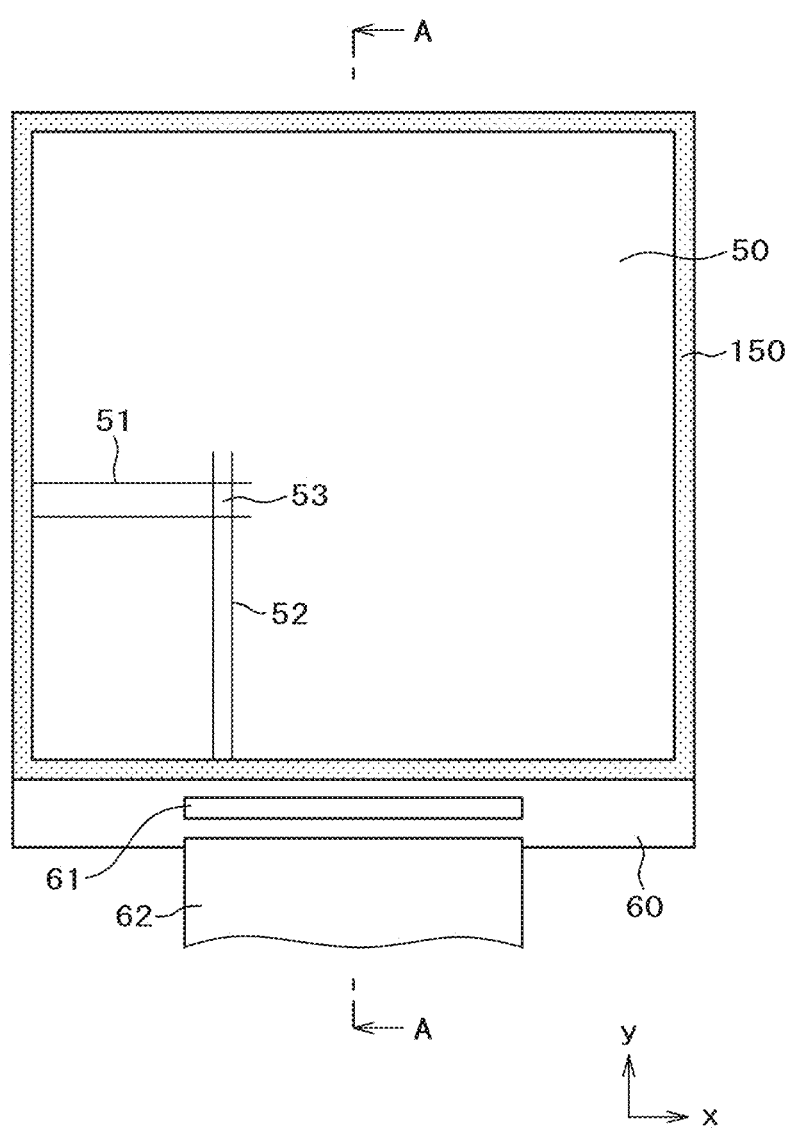
FIG. 1 is a plan view of a liquid crystal display device.
Figure 2:
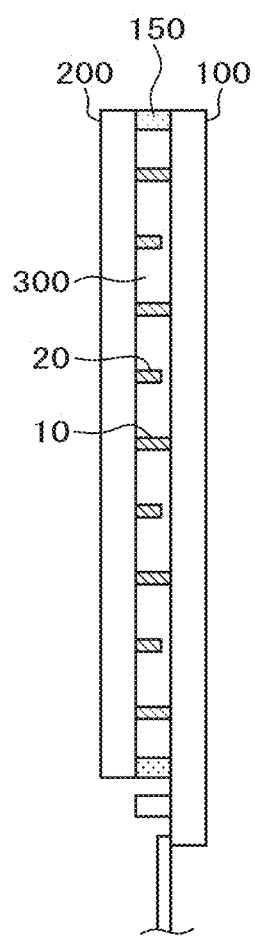
FIG. 2 is a sectional view taken along the line A-A of FIG. 1.

FIG. 1 is a plan view of a liquid crystal display device and FIG. 2 is a sectional view taken along the line A-A of FIG.

1. In FIG. 1 and FIG. 2, the peripheral areas of a TFT substrate 100 and an opposite substrate 200 are stuck together through a seal material 150 and a liquid crystal layer 300 is sealed inside them. A display area 50 is formed in an area where the TFT substrate 100 and the opposite substrate 200 overlap. On the TFT substrate 100 in the display area 50, scan lines 51 extend in the horizontal direction (x direction) and are arrayed in the vertical direction (y direction). Also, image signal lines 52 extend in the vertical direction and are arrayed in the horizontal direction. A pixel 53 is formed in a region surrounded by scan lines 51 and image signal lines 52.

The TFT substrate 100 is larger than the opposite substrate 200 and the portion of the TFT substrate 100 that does not overlap the opposite substrate 200 is a terminal area 60. A flexible wiring substrate 62 to supply electric power and a signal to the liquid crystal display device is connected to the terminal area 60. In addition, a driver IC 61 to make an image signal or the like is disposed in the terminal area 60. When the terminal area 60 is small, the driver IC 62 may be mounted on the flexible wiring substrate side.

Figure 3:
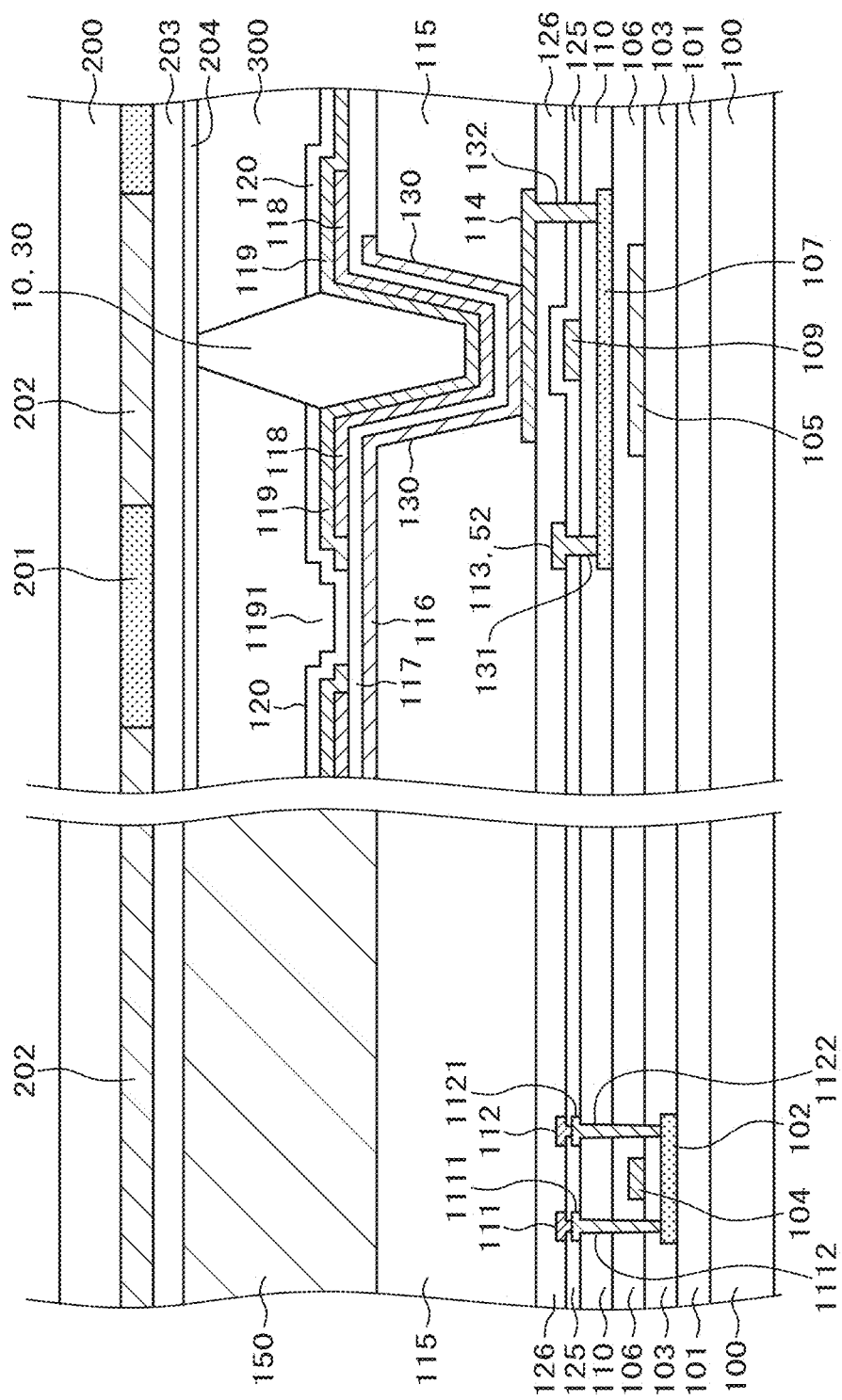
FIG. 3 is a sectional view of the display area of the liquid crystal display device according to the first embodiment.
Figure 7:
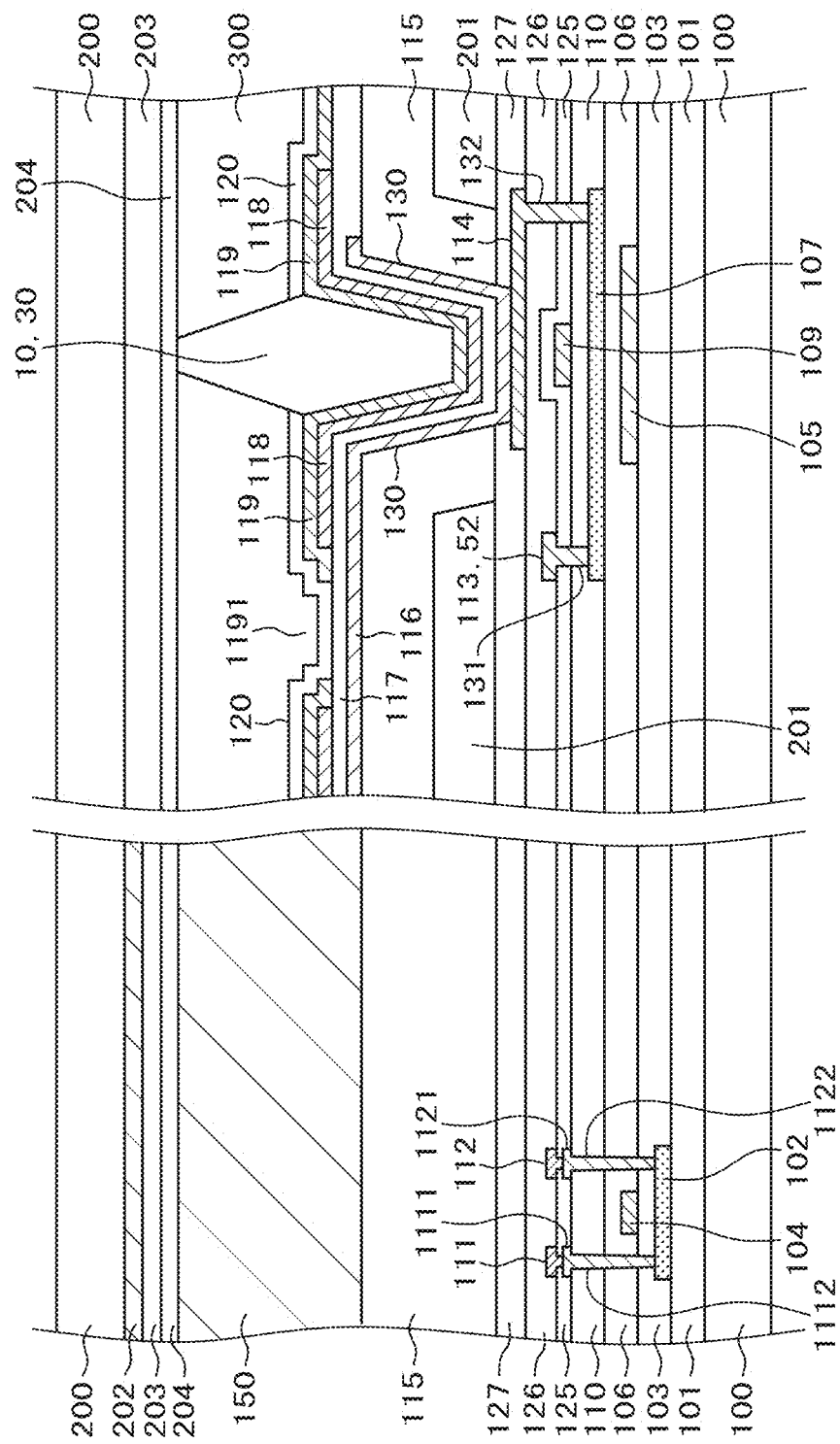
FIG. 7 is a sectional view of a pixel region according to the second embodiment.

The gap between the TFT substrate 100 and the opposite substrate 200, namely the thickness of the liquid crystal layer 300, must be kept constant throughout the display area. For this reason, as shown in FIG. 2, pillar spacers 10, 20 are disposed on the opposite substrate 200 side to keep the gap between the TFT substrate 100 and the opposite substrate 200. However, pillar spacers may be formed on the TFT substrate 100 side as illustrated in the embodiment described below. In FIG. 2, the function of pillar spacers is explained, assuming that pillar spacers are formed on the opposite substrate 200 side. Even when pillar spacers are formed on the TFT substrate 100 side as shown in FIG. 3 and FIG. 7, the pillar spacers function in the same way. Although not explained in detail here, the gap between the TFT substrate 100 and the opposite substrate 200 may be kept constant by making a spacer formed on the TFT substrate 100 side contact a spacer formed on the opposite substrate 200 side and using the two spacers.

The pillar spacers include main pillar spacers 10 and sub pillar spacers 20. In a normal state, the main pillar spacer 10 determines the gap between the TFT substrate 100 and the opposite substrate 200. The sub pillar spacer 20 is smaller in terms of height than the main pillar spacer 10. In a normal state, the sub pillar spacer 20 is not in contact with the TFT substrate 100 and if a pushing pressure is applied to the opposite substrate 200 or TFT substrate 100, the sub pillar spacer 20 contacts the TFT substrate 100 to prevent the gap between the TFT substrate 100 and the opposite substrate 200 from becoming extremely small. The diameter of the sub pillar spacer 20 is larger than the diameter of the main pillar spacer 10 and the number of sub pillar spacers 20 is larger than the number of main pillar spacers 10.

In FIG. 1, a scan signal driving circuit to make a scan signal is formed in the frame portion on both sides of the display area 50 as will be explained later in reference to FIG. 3 and FIG. 7. In this embodiment, a TFT based on oxide semiconductor (oxide semiconductor TFT) is used for the TFT in the display area 50 and a TFT based on polysilicon semiconductor (polysilicon semiconductor TFT) is used for a peripheral driving circuit such as the above-mentioned scan signal driving circuit. Since polysilicon semiconductor is higher in terms of mobility than oxide semiconductor, it is suitable for formation of a peripheral driving circuit. On the other hand, an oxide semiconductor TFT is lower in terms of mobility than polysilicon semiconductor, but it is smaller in terms of leak current than a polysilicon semiconductor TFT, so it is suitable as a switching element in a pixel.

FIG. 3 shows a sectional view of a pixel region having an oxide semiconductor TFT and a sectional view of a peripheral driving circuit having a polysilicon semiconductor TFT formed in the frame area, in a liquid crystal display device according to the first embodiment. In FIG. 3, the figure on the left is a sectional view of the peripheral driving circuit and the figure on the right is a sectional view of the pixel region is. Since the pixel region and the peripheral driving circuit are formed by the same process, the same layers in the peripheral driving circuit and the pixel region are designated by the same reference numbers. Details of the peripheral driving circuit are omitted here and only the TFT that uses the polysilicon semiconductor film 102 used in the circuit is illustrated.

In FIG. 3, for example, an underlying film 101 is formed over the TFT substrate 100 made of glass. The function of the underlying film 101 is to prevent impurities from the TFT substrate 100, etc. from contaminating the polysilicon semiconductor film 102 or the oxide semiconductor film 107. The underlying film 101 generally has a double-layered structure of a nitride silicon layer (hereinafter sometimes called SiN layer) and an oxide silicon layer (hereinafter sometimes called SiO).

The polysilicon semiconductor film 102 is formed over the underlying film 101 in the peripheral driving circuit. The polysilicon semiconductor film 102 is prepared by initially forming an a-Si film and converting it into polysilicon by an excimer laser. The underlying film 101 and a-Si film are successively formed by CVD (Chemical Vapor Deposition).

A first gate insulating film 103 is formed covering the polysilicon semiconductor film 102. The first gate insulating film 103 is a SiO film made of TEOS (Tetraethoxysilane). A first gate electrode 104 is formed over the first gate insulating film 103. The first gate electrode 104 is formed as a laminated film of MoW, Ti or Ti—Al-Ti. On the other hand, on the pixel side, a first light shielding film 105 is formed with the same material and by the same process as the first gate electrode 104. The first light shielding film 105 extends in the same direction as the scan line 51 in FIG. 1 and is arrayed in the same direction as the scan line 51. The first light shielding film 105 covers the oxide semiconductor TFT, through hole 130, etc. from below to shield the light from the backlight.

The following explanation is made of the cross-sectional structure of a pixel. The first gate insulating film 103 as SiO film is formed covering the underlying film 101. A second gate insulating film 106 is formed covering the first light shielding film 105 formed over the first gate insulating film 103. The oxide semiconductor film 107 formed over the second gate insulating film 106 forms a TFT channel under a second gate electrode 109 and over the first light insulating film 105.

A third gate insulating film 110 is formed covering the oxide semiconductor film 107. The third gate insulating film 110 includes two SiO layers. The portion corresponding to the channel portion of the oxide semiconductor film 107 is a first SiO layer which is oxygen-rich and the other portion is a second SiO film which has a dense film. The first SiO film is oxygen-rich so that oxygen can be supplied to the oxide semiconductor film 107.

The second gate electrode 109 is formed over the third gate insulating film 110. As the material of the second gate electrode 109, the same material as that of the first gate electrode 104 can be used. FIG. 3 shows a top gate type in which a TFT channel portion is formed under the second gate electrode 109 and when a gate voltage is applied to the first light shielding film 105, a dual gate type TFT can be formed. In this case, the first light shielding film 105 is made of the same metal material as the first gate electrode 104 and functions in the display area 50 as a second scan line that is the same as the scan line 51.

After formation of the third gate insulating film 110, in the peripheral driving circuit, a through hole 1112 is formed in three insulating films, namely the first gate insulating film 103, second gate insulating film 106 and third gate insulating film 110 to form a first drain electrode 1111, and a through hole 1122 is formed to form a first source electrode 1121. The first drain electrode 1111 and the first source electrode 1121 are made of the same material and by the same process as the second gate electrode 109 and connected to the polysilicon semiconductor film 102.

A first interlayer insulating film 125 is formed covering the second gate electrode 109. In many cases, the third gate insulating film 110 is also a double-layered structure that includes a SiN layer and a SiO layer. The SiO layer is often a lower layer. The reason for this is that oxygen should not be taken out of the oxide semiconductor film 107.

After formation of the first interlayer insulating film 125, in the peripheral driving circuit, a through hole is formed in the first interlayer insulating film 125, a first drain wiring 111 and another through hole are formed to form a first source wiring 112 and they are connected to the first drain electrode 1111 and first source electrode 1121 respectively. At the same time, in the pixel region, a through hole 131 is formed in the third gate insulating film 110 and the first interlayer insulating film 125 to form an image signal line 52 and a second drain electrode 113, and the second drain electrode 113 is connected to the oxide semiconductor film 107. After that, a second interlayer insulating film 126 made of an inorganic material such as SiN film is formed in a manner to cover the image signal line 52, first drain wiring 111 and first source wiring 112, and a second source electrode 114 is formed over the second interlayer insulating film 126. The second source electrode 114 is connected to the oxide semiconductor film 107 through a through hole 132. While the first drain wiring 111, first source wiring 112 and second drain electrode 113 are made of metal, the second source electrode 114 is made of ITO (Indium Tin Oxide) as transparent conductive film and connected to a pixel electrode 116. In the through hole 131, the image signal line 52 has a function as the second drain electrode 113 and is connected to the oxide semiconductor film 107 which is electrically conductive. The image signal line 52 can be made of the same material as the first gate electrode 104 or the like, such as MoW, Ti or Ti—Al-Ti laminated film.

An organic passivation film 115 is formed covering the second interlayer insulating film 126. The organic passivation film 115 is formed with a large thickness of 2 μm to 4 μm in order to make it function as a flattening film and suppress capacitive coupling between the image signal line 52 and the pixel electrode 116 or common electrode 119.

Since FIG. 3 shows a common electrode top type, the pixel electrode 116 is formed using ITO as transparent conductive film over the organic passivation film 115. The pixel electrode 116 has a rectangular shape to suit the shape of the pixel. The through hole 130 is formed in the organic passivation film 115 to connect the pixel electrode 116 and the second source electrode 114.

In FIG. 3, a capacitive insulating film 117 is formed over the pixel electrode 116 and a second light shielding film 118 of metal is formed over it, and the common electrode 119 is formed using ITO over it. Since the capacitive insulating film 117 constitutes a pixel capacitance formed between the pixel electrode 116 and the common electrode 119, it is called as such. The capacitive insulating film 117 is made of SiN with a high relative permittivity. The second light shielding film 118 and common electrode 119 are formed over the capacitive insulating film 117.

The second light shielding film 118 is made of metal such as molybdenum (Mo), titanium (Ti), aluminum (Al) or the like. The second light shielding film 118 shields unwanted light from the backlight to improve the contrast of the image. In the structure shown in FIG. 3, a black matrix 202 that has a light shielding effect is formed on the opposite substrate 200, but the second light shielding film 118 can be effective in shielding the light which the black matrix 202 has failed to shield, preventing color mixing of light from inside, and preventing a voltage drop of the common electrode 119.

However, the formation of the second light shielding film 118 decreases the light transmittance, so when the black matrix 202 is provided on the opposite substrate 200, the second light shielding film 118 is omissible depending on the required image quality. Alternatively, the shape of the second light shielding film 118 may be changed, not for the purpose of light shielding, but for the purpose of preventing a voltage drop of the common electrode 119.

The common electrode 119 is made of ITO. Since ITO has a relatively high resistance, the second light shielding film 118 made of metal may be laid over it to decrease the resistance and keep the uniformity of the image. The common electrode 119 is shared by a plurality of pixels and a slit 1191 is formed in it for each pixel.

Pillar spacers are required in order to keep the gap between the TFT substrate 100 and the opposite substrate 200. However, if the pixel pitch is small, it is difficult to obtain space for pillar spacers. In the first embodiment, a filler 30 is formed in the through hole 130 and a pillar spacer 10 is formed using the filler 30. The filler 30 is made of light-sensitive resin such as acrylic resin. The use of the light-sensitive resin eliminates the need to specially form a resist for photolithography. For the material of the filler 30, it is also possible to use the same material as that of the organic passivation film.

The pillar spacer shown in FIG. 3 is a main pillar spacer 10 and contacts the opposite substrate 200 side, but it is also possible to form a sub pillar spacer that does not contact the opposite substrate 200 side. A pillar spacer is not formed for every pixel. In a pixel for which a pillar spacer is not formed, the filler 30 is filled in the through hole 130 and the upper surface of the through hole 130 is flattened. Using the filler 30, any of the main pillar spacer 10, the sub pillar spacer 20 and the flattened surface can be made by the same process. Specifically, a light-sensitive acrylic resin is coated with a specified thickness all over the display area and the intensity of exposure is controlled for each spot through a mask so that the acrylic resin with a required thickness for the spot is left behind.

A first orientation film 120 is formed covering the common electrode 119. The first orientation film 120 determines the initial orientation of a liquid crystal molecule along with a second orientation film 204 formed on the opposite substrate 200 side. The orientation films 120 and 204 are made of polyimide. For the orientation process for the orientation films 120 and 204, the rubbing method or the photo alignment process using deflected ultraviolet rays may be used. Although FIG. 3 shows the first orientation film 120 that is not formed over the pillar spacer 10, this varies depending on the viscosity of the orientation film material to be coated, levelling in the drying process or other factors, so in some cases the first orientation film 120 is formed over the pillar spacer 10 too.

As a voltage is applied to the pixel electrode 116, an electric line of force that passes from the pixel electrode 116 toward the common electrode 119 through the liquid crystal layer 300 is generated in the slit 1191 of the common electrode 119, and rotates the liquid crystal molecules and changes the transmittance of the liquid crystal layer 300. An image is formed by changing the transmittance of the liquid crystal layer 300 for each pixel. In other words, IPS (In Plane Switching) is performed.

In the first embodiment, the area of a pixel is very small. On the other hand, the thickness of the organic passivation film 115 cannot be decreased and it is difficult to decrease the size of the through hole 130. Therefore, for the purpose of space saving, the through hole 130 is formed in the organic passivation film 115 immediately over the TFT as shown in FIG. 3.

In FIG. 3, the opposite substrate 200 is disposed with the liquid crystal layer 300 sandwiched. The color filter 201 and black matrix 202 are formed in the opposite substrate 200. The color filter 201 is intended to form a color image and the black matrix 202 is intended to improve the contrast of the image. An overcoat film 203 is formed covering the color filter 201 and the black matrix 202. The overcoat film 203 prevents the color pigment in the color filter 201 from steeping into the liquid crystal layer 300. The second orientation film 204 is formed covering the overcoat film 203. The function of the second orientation film 204 is the same as the function of the first orientation film 120 that has been explained above.

Figure 4:
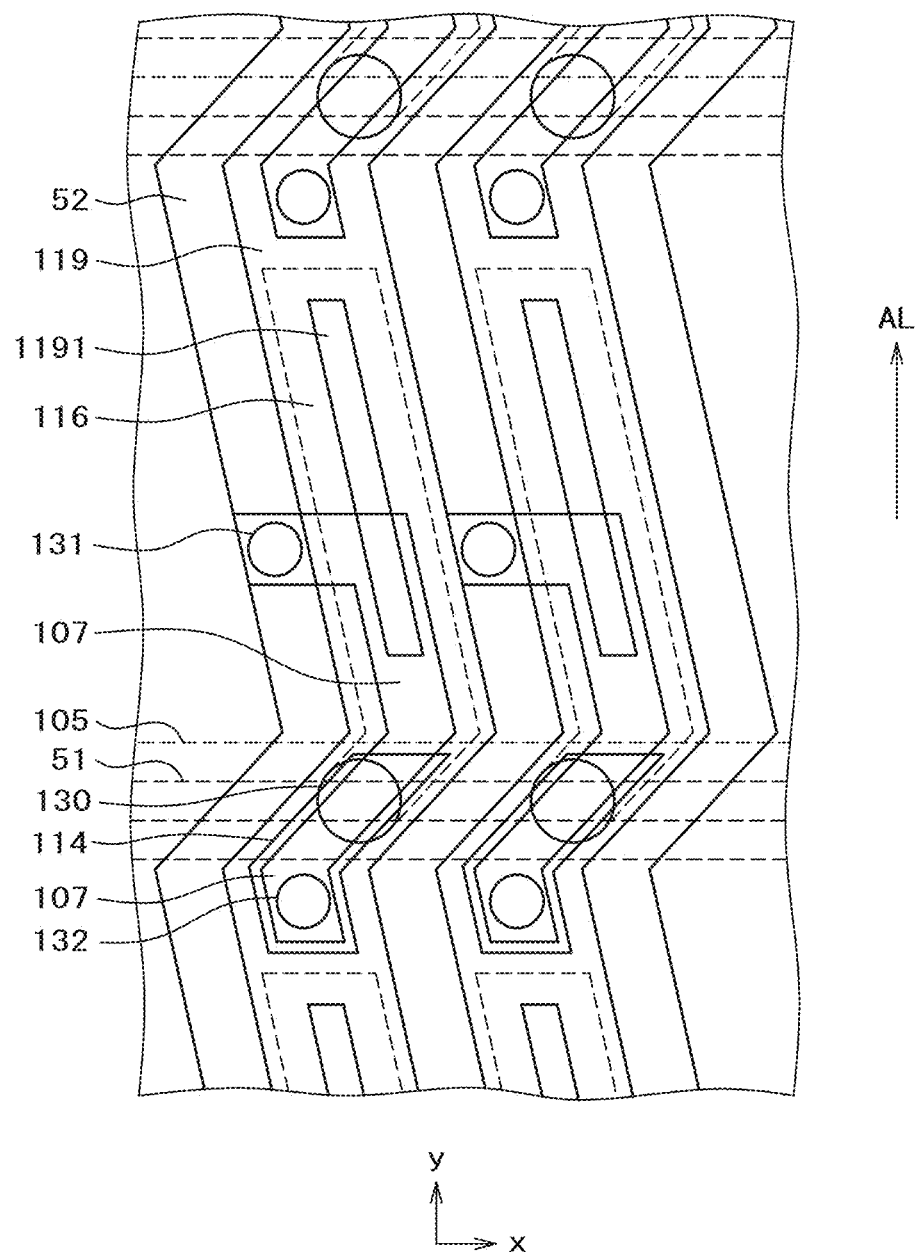
FIG. 4 is a plan view of a pixel region according to a comparative example.

FIG. 4 is a plan view of a pixel in a comparative example. In FIG. 4, the first light shielding film 105 and scan line 51 extend in the horizontal direction (x direction) and are arrayed in the vertical direction (y direction). The image signal line 52 extends in the vertical direction and is arrayed in the horizontal direction. However, the image signal line 52 is inclined at a first angle with respect to the vertical direction (y direction) in a region where it does not overlap the first light shielding film 105 and at a second angle in the opposite direction in a region where it overlaps the first light shielding film 105. In this case, the orientation of the first orientation film 105 is the vertical direction as indicated by AL in FIG. 4.

In FIG. 4, the pixel electrode 116 indicated by dotted line and the slit 1191 of the common electrode 119 are also inclined at the first angle with respect to the vertical direction in the same manner as the image signal line 52. The purpose of inclining the pixel electrode 116 and the slit 1191 of the common electrode 119 with respect to the vertical direction in this way is to form the first angle with respect to the orientation of the first orientation film 120. This prevents generation of a domain in the pixel. The first angle is, for example, 8 degrees to 15 degrees.

In FIG. 4, the orientation angle of the first orientation film 120 is the vertical direction and thus the pixel electrode 116, etc. is inclined at the first angle with respect to the vertical direction. If the first orientation film is inclined at a specific angle with respect to the vertical direction, the pixel electrode 116, etc. is inclined at the first angle with respect to the specific angle.

In FIG. 4, the first light shielding film 105 extends in the horizontal direction and the image signal line 52 is inclined at the second angle larger than the first angle in the opposite direction in the region where it overlaps the first light shielding film 105, thereby offsetting a horizontal shift of the image signal line 52. The function in FIG. 4 will be explained below.

In FIG. 4, TFT is formed above the first light shielding film 105. In other words, TFT etc. is light-shielded from the backlight. In FIG. 4, the oxide semiconductor film 107 as a drain wiring extends from the through hole 131 formed over the image signal line 52 in the vertical direction inside the pixel. Since the oxide semiconductor film 107 is electrically conductive and transparent, its light transmittance does not drop largely. A TFT channel is formed in a region where the scan line 51 and the oxide semiconductor film 107 intersect with each other. If the first light shielding film 105 also functions as the second scan line, a TFT channel is formed in a region where the first light shielding film 105 and the oxide semiconductor film 107 intersect with each other.

In FIG. 4, the oxide semiconductor film 107, which is electrically conductive, further extends downward and is connected to the second source electrode 114 made of ITO in the through hole 132. The second source electrode 114, which is parallel to the image signal line 52, extends upward in the y direction and is connected to the pixel electrode 116 in the through hole 130. In FIG. 4, in the region from the through hole 132 to the through hole 130, the oxide semiconductor film 107 and the second source electrode 114 are formed in a manner to overlap each other in a plan view.

The pillar spacer 10, which is intended to keep the gap between the TFT substrate 100 and the opposite substrate 200, is formed in the through hole 130 like the filler 30 as illustrated in FIG. 3. However, the main pillar spacer 10 or sub pillar spacer 20 is not formed in the through hole 130 of every pixel.

In FIG. 4, the pixel electrode 116 has a parallelogram portion that fits the shape of the pixel. The common electrode 119 is shared by a plurality of pixels and has a slit 1191 formed in a position where it overlaps the pixel electrode 116.

The pixel electrode 116 is connected to the second source electrode 114 in the through hole 130. When a voltage is applied to the pixel electrode 116, an electric line of force that passes through the liquid crystal is generated in the slit 1191 between the pixel electrode 116 and the common electrode 119 so that the liquid crystal molecules are rotated to control the light transmittance in the pixel.

When the pixel pitch is small, a problem arises about the space for the through hole 130 to be formed in the organic passivation film 115 to connect the pixel electrode 116 and the TFT second source electrode 114. In this region, since the image signal line 52 is largely inclined with respect to the vertical direction, the problem about the space is more serious.

Figure 5:
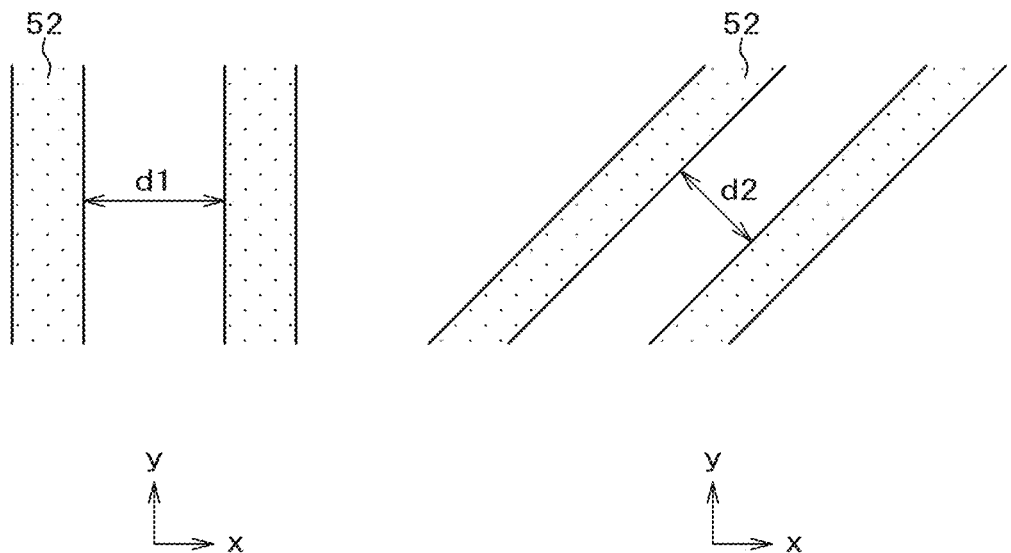
FIG. 5 is a plan view that shows comparison in the distance between image signal lines.

FIG. 5 is a schematic diagram that is related to this problem. The left figure of FIG. 5 shows a case that the image signal line 52 extends in the vertical direction (y direction). In this case, the distance between an image signal line 52 and an image signal line 52 is expressed by d1. On the other hand, the right figure of FIG. 5 shows a case that the image signal line 52 is inclined at a specific angle with respect to the vertical direction, for example, the second angle. In this case, the distance between an image signal line 52 and an image signal line 52 is expressed by d2. The relation of distance here is d2<d1. Therefore, in addition to the problem that the image pitch is small in a high-definition image, there arises another problem that the distance between image signal lines 52 is smaller due to oblique wiring.

Particularly, in the vicinity of the through hole 130 where the pixel electrode 116 and the second source electrode 114 are connected, the wiring is complicated, pausing a problem of interference by an adjacent pixel in this region. In addition, when the distance between adjacent image signal lines 52 is small, it is difficult to obtain sufficient space to connect the pixel electrode 116 and the second source electrode 114. The present invention is intended to address this problem.

Figure 6:
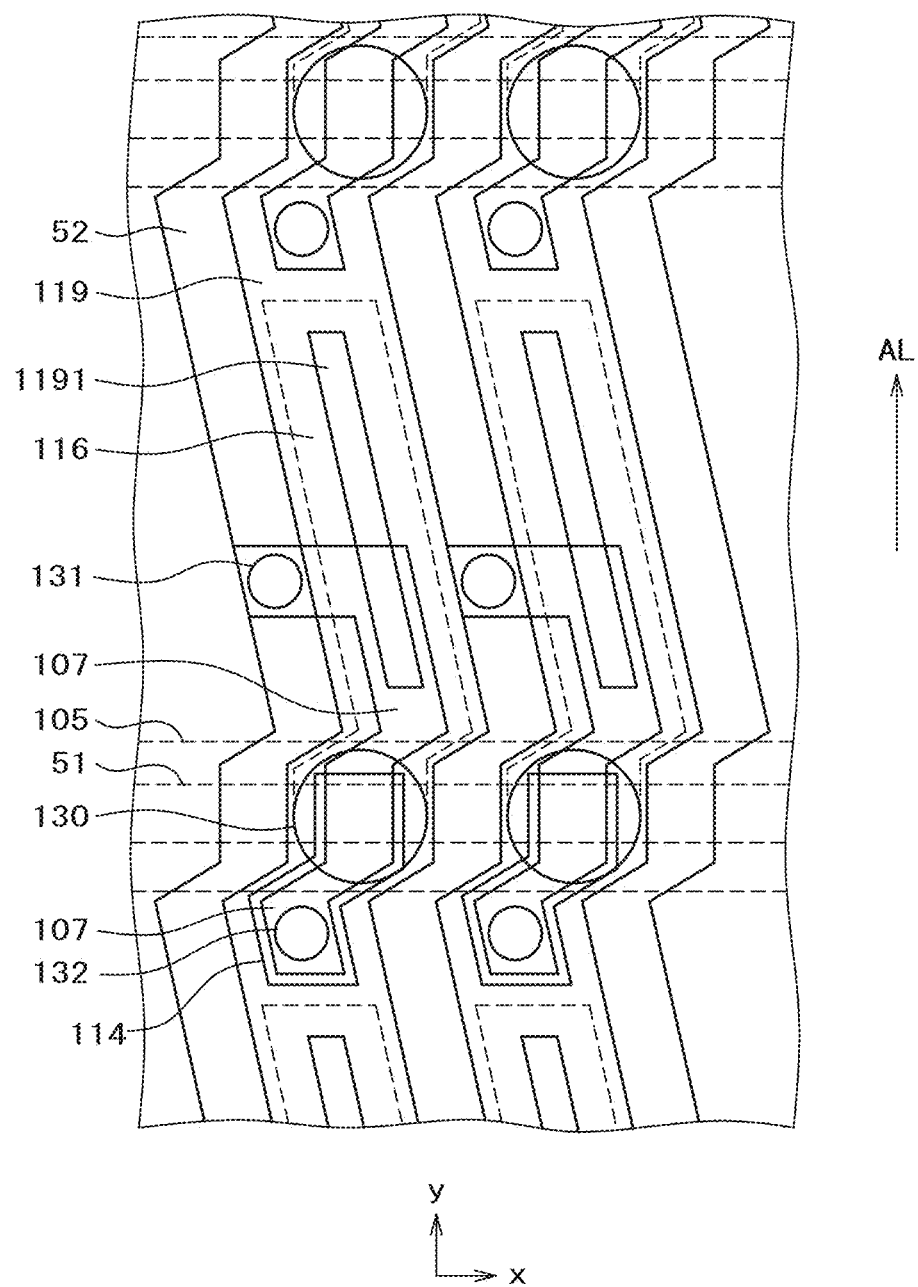
FIG. 6 is a plan view of a pixel region according to the first embodiment.

FIG. 6 is a plan view of the first embodiment that addresses the above-mentioned problem. In the structure of FIG. 6, the image signal line 52 has a first portion that extends at a first angle with respect to the vertical direction (y direction) in the region where it does not overlap the first light shielding film 105, namely the region where it is adjacent to the pixel electrode 116. In the region where it overlaps the first light shielding film 105, it has a second portion extending at a second angle in the opposite direction to the first angle, a third portion extending in the vertical direction, and a fourth portion extending at a fourth angle with respect to the vertical direction. The fourth angle can be different from the second angle, but in many cases the fourth angle is the same as the second angle. Therefore, hereinafter in this specification, the second angle includes the fourth angle.

FIG. 6 is different from FIG. 4 in the structure of the region around the through hole 130 where the pixel electrode 116 and the second source electrode 114 are connected. This region is a region where the first light shielding film 105 overlaps. In this region, the image signal line 52 has the second portion largely inclined with respect to the vertical direction, the third portion extending in the vertical direction and the fourth portion largely inclined with respect to the vertical direction. The width of the image signal line 52 in the third portion is larger than in the first portion, second portion and fourth portion.

The structure shown in FIG. 6 is intended to increase the distance between adjacent image signal lines 52 in the region where the through hole 130 is formed. In the region where the through hole 130 is formed, the image signal line 52 extends in the vertical direction, so the distance between adjacent image signal lines 52 can be larger. Therefore, the size of the through hole 130 formed in the organic passivation film 115 can also be larger. Furthermore, as for the wirings that overlap the through hole 130 or are formed in the vicinity of the through hole 130, the wiring layout tolerance can be increased and the reliability can be improved.

In FIG. 6, the elements except the elements in the through hole 130 and its vicinity are the same as explained above in reference to FIG. 4. When the angle of the image signal line 52 with respect to the vertical direction is larger, the structure shown in FIG. 6 is more effective. As explained above, the structure of the first embodiment shown in FIG. 6 can increase the wiring layout tolerance so that a reliable high-definition liquid crystal display device can be realized.

Second Embodiment

In the first embodiment, the structure in which the color filter 201 and the black matrix 202 are formed on the opposite substrate 200 side has been described. In this case, the accuracy in joining the TFT substrate 100 and the opposite substrate 200 affects the transmittance, etc. of the liquid crystal display device. When the pixel pitch is large, it is possible to compensate for an error in the accuracy of joining the TFT substrate 100 and the opposite substrate 200. However, as the screen has a higher degree of definition, in some cases this error cannot be ignored.

This problem can be solved by forming the color filter 201 and the black matrix 202 on the TFT substrate 100 side. The reason for this is that a photolithography error on the TFT substrate 100 side is far smaller than an error in the accuracy of joining the TFT substrate 100 and the opposite substrate 200.

FIG. 7 is a sectional view of the second embodiment. The important point in which FIG. 7 is different from FIG. 3 for the first embodiment is that in the display area 50 the color filter 201 and black matrix 202 are not formed on the opposite substrate 200 and only the second orientation film 204 is formed over the overcoat film 203. On the other hand, in the frame area, the black matrix 202 that overlaps the seal material 150 is formed. Therefore, the accuracy in joining the opposite substrate 200 and the TFT substrate 100 does not affect the performance of the liquid crystal display device. However, the overcoat film 203 is omissible.

In FIG. 7, a color filter 201 is formed under the organic passivation film 115 on the TFT substrate 100 side. A third interlayer insulating film 127 made of an inorganic material such as SiN film is formed between the color filter 201 and the second source electrode 114. The third interlayer insulating film 127 has a through hole in a position where it overlaps the through hole 130 of the organic passivation film 115, so that the pixel electrode 116 and the second source electrode 114 are connected. In addition, the second light shielding film 118 performs the function as the black matrix 202. The second light shielding film 118 is a metal laminated film and constitutes an antireflection film together with the ITO film. Therefore, it can have the function as the black matrix 202.

The second light shielding film 118 not only performs the function as an antireflection film, but also has an effect to prevent color mixing between adjacent pixels and prevent a voltage drop of the common electrode 119. In FIG. 7, the organic passivation film 115 is formed over the color filter 201, but conversely the organic passivation film 115 may be formed under the color filter 201.

Figure 8:
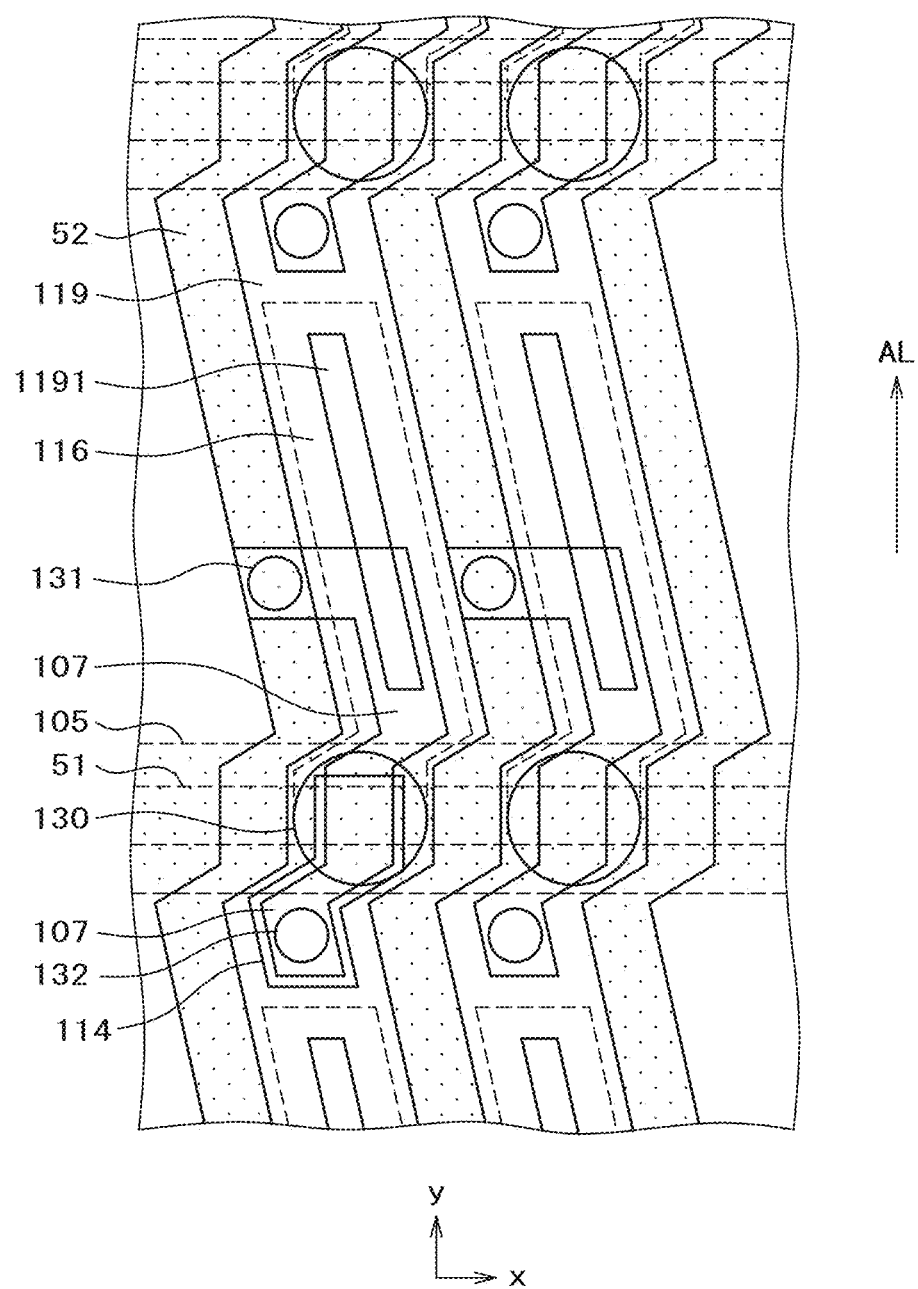
FIG. 8 is a plan view of a pixel portion according to the second embodiment.

FIG. 8 is a plan view of the pixel region according to the second embodiment. In FIG. 8, the area where the second light shielding film 118 is formed is indicated by shading with dots. Since the second light shielding film 118 is laminated with the common electrode 119 formed all over the display area, it can be formed in any desired position.

In the structure shown in FIG. 8, the second light shielding film 118 is formed in a manner to overlap the first light shielding film 105 and the image signal line 52 in a plan view. This is the same region as covered by the black matrix 202 in the display area 50 formed on the opposite substrate 200 in the first embodiment.

As explained above, the present invention can also be applied to the COA (Color Filter on Array) type.

What is claimed is:

1. A liquid crystal display device in which a first light shielding film extending in a first direction and an image signal line are formed on a TFT substrate, the image signal line comprising:

in a region that does not overlap the first light shielding film, a first portion extending at a first angle with respect to a second direction perpendicular to the first direction; and in a region that overlaps the first light shielding film, a second portion extending at a second angle with respect to the second direction, a third portion extending in the second direction, and a fourth portion extending at a fourth angle with respect to the second direction, wherein the second angle and the fourth angle are larger than the first angle, and the second angle and the fourth angle are the same.

2. The liquid crystal display device according to claim 1, wherein a first image signal line has a structure of the image signal line in claim 1, a second image signal line has the structure of the image signal line in claim 1, a first region is located between the first portion of the first image signal line and the first portion of the second image signal line, a third region is located between the third portion of the first image signal line and the third portion of the second image signal line, and a distance between the first image signal line and the second image signal line is larger in the third region than in the first region.

3. The liquid crystal display device according to claim 2, wherein a pixel electrode exists in the first region, a TFT to connect the first image signal line and the pixel electrode exists, and a through hole to connect the pixel electrode and the TFT is formed in the third region.

4. The liquid crystal display device according to claim 3, wherein the pixel electrode is formed over an organic passivation film, and the TFT is formed under the organic passivation film, and the through hole is formed in the organic passivation film.

5. The liquid crystal display device according to claim 4, wherein an opposite substrate is disposed facing the TFT substrate, and a color filter is formed in a manner to overlap the organic passivation film of the TFT substrate.

6. The liquid crystal display device according to claim 5, wherein the color filter is formed under the organic passivation film.

7. The liquid crystal display device according to claim 6, wherein a second light shielding film is formed in a manner to overlap the first light shielding film, the first image signal line, and the second image signal line.

8. The liquid crystal display device according to claim 7, wherein a black matrix is non-existent in a display area of the opposite substrate.

9. The liquid crystal display device according to claim 3, wherein a common electrode is formed through a capacitive insulating film in a manner to overlap the pixel electrode, and a second light shielding film is formed in a manner to overlap the common electrode.

10. The liquid crystal display device according to claim 9, wherein the second light shielding film is formed in a manner to overlap the first light shielding film, the first image signal line, and the second image signal line.

11. The liquid crystal display device according to claim 3, wherein an opposite substrate is disposed facing the TFT substrate, and a gap between the TFT substrate and the opposite substrate is kept by a pillar spacer formed in the through hole.

12. The liquid crystal display device according to claim 2, wherein an opposite substrate is disposed facing the TFT substrate, and a color filter and a black matrix are formed on the opposite substrate.

* * * * *